H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 3.

Inventor
Harry Blount

H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 5.

Inventor
Harry Blount
by George Bayard James
Atty.

H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 7.

Inventor
Harry Blount
by George Bayard Jones
Atty.

H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 8.

Inventor
Harry Blount
by George Bayard Jones
Atty

H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 9.

Inventor
Harry Blount
by George Bayard Jones
Atty.

H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 10.

Inventor
Harry Blount
by
Atty

H. BLOUNT.
MEANS FOR GRINDING AND SLOTTING CARBON DISKS AND THE LIKE.
APPLICATION FILED MAR. 7, 1917.

1,345,743.

Patented July 6, 1920.
11 SHEETS—SHEET 11.

Inventor
Harry Blount

UNITED STATES PATENT OFFICE.

HARRY BLOUNT, OF OAK PARK, ILLINOIS, ASSIGNOR TO WESTERN ELECTRIC COMPANY, INCORPORATED, OF NEW YORK, N. Y., A CORPORATION OF NEW YORK.

MEANS FOR GRINDING AND SLOTTING CARBON DISKS AND THE LIKE.

1,345,743. Specification of Letters Patent. Patented July 6, 1920.

Application filed March 7, 1917. Serial No. 153,045.

*To all whom it may concern:*

Be it known that I, HARRY BLOUNT, a citizen of the United States, residing at Oak Park, in the county of Cook and State of Illinois, have invented certain new and useful Improvements in Means for Grinding and Slotting Carbon Disks and the like, of which the following is a full, clear, concise, and exact description.

This invention relates to improvements in grinding machines.

The embodiment of the invention disclosed herein is a machine which grinds carbon disks and their supporting disks to a predetermined diameter, giving them a roughing cut and a finishing cut and thereafter cutting a pair of notches in opposite sides thereof. Such carbon disks are used in telephone transmitters and have heretofore been turned in a lathe and thereafter slotted as a separate operation.

The general object of this invention is to provide a machine which shall perform these operations automatically, thereby effecting a substantial economy in time and labor.

Other objects are: to provide a machine adapted to grasp and rotate the object to be ground and to present it successively to the grinding wheels; to provide a machine of this character having grinding wheels which are moved back and forth over the object being ground to prevent uneven wearing away of the faces of said wheels; to provide means for effecting very fine adjustment of the grinding wheels, thereby insuring accurate grinding of the disks within close limits; to provide slotting grinders which may be used in conjunction with the other grinders or rendered inoperative at will; and to provide a machine having the foregoing features which shall operate rapidly and continuously.

The machine is provided with a suitable base 1 in the form of a casting supported on a table or other suitable support 2. A part of the operating mechanism is arranged beneath the base and is inclosed within a suitable housing 3, the remainder of the mechanism being mounted above said base. A driving motor 4 is suitably mounted beneath said table.

The piece to be operated on consists of a carbon disk 5 (Fig. 31) secured to a backing or plate 6 of conducting material, for example brass, the latter having a screw-threaded stem 7 extending therefrom. The purpose of the machine is to grind the disk and its plate 6 to a predetermined diameter and thereafter grind a pair of notches 8 (Fig. 32) therein at diametrically opposite points. The machine is also used to grind in like manner a second type of disk 9 (Fig. 33) mounted on a plate 10 and having a screw-threaded boss 11 thereon from which an integral screw-threaded stem 12 projects. Either disk and its metallic support, while being operated on, are mounted on the top of a revolving turret 13 (Fig. 1) having a plurality of chucks 14 arranged at the top thereof at equal radial distances from the center. The chucks rotate continuously, except in one circumferential position, and the turret as a whole, carrying said chucks, rotates intermittently. There are four chucks in the present instance and the turret rotates a quarter of a revolution at a time.

In operating on the work piece, the screw-threaded stem, in either form of device, is held between the jaws of the chuck as the turret rotates, the disk and its support being ground down first by an abrasive wheel 15 which gives it a roughing cut. Thereafter a one-fourth revolution of the turret brings said disk to a second abrasive wheel 16, which gives a finishing cut, whereby the disk and its support are ground down to exactly the desired diameter, after which an additional one-fourth turn of the turret brings said disk adjacent to a pair of abrasive disks 17, which simultaneously grind the notches in opposite sides thereof. During the next one-quarter turn of the turret, the chuck releases the screw-threaded stem whereupon the work piece is lifted out of the chuck, deflected into a chute 18 and discharged.

Figure 7:
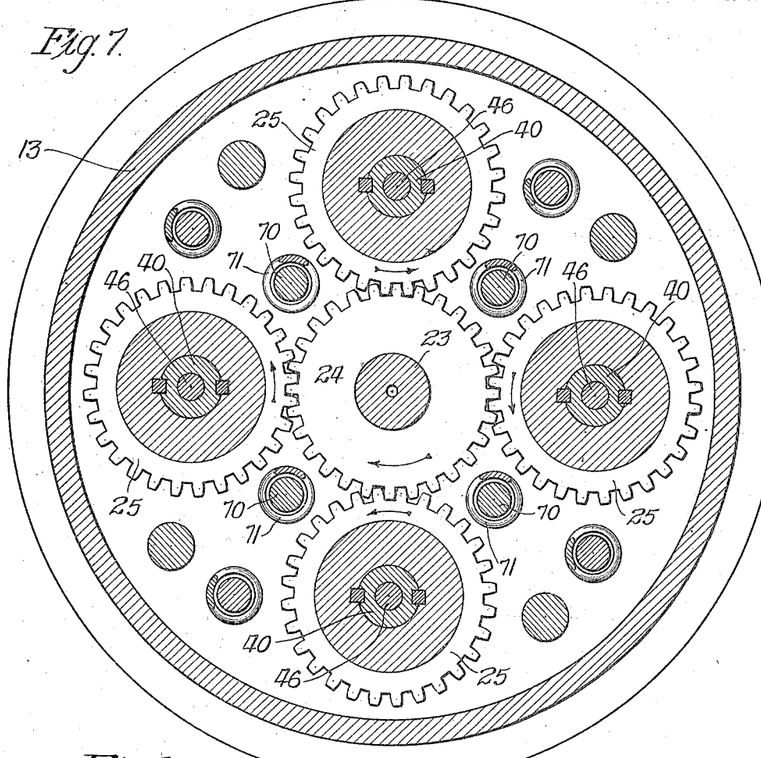
Fig. 7 is a section on the line 7—7 of Fig. 5.
Figures 8, 9:
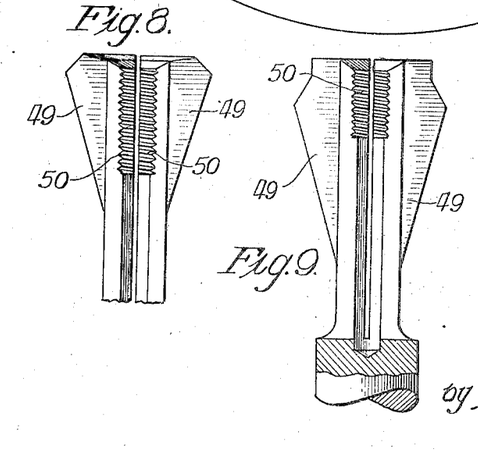
Fig. 8 is an elevation of two of the chuck fingers.
Fig. 9 is a similar elevation of a modified form.
Figure 10:
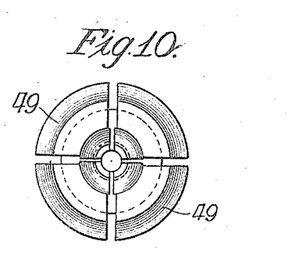
Fig. 10 is a top plan view of the latter device.
Figure 11:
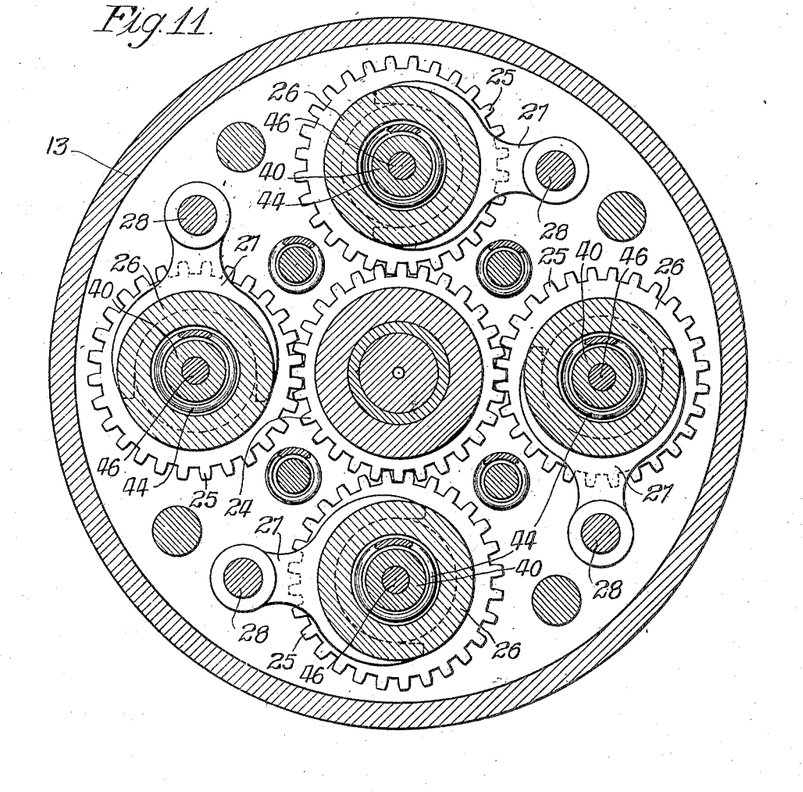
Fig. 11 is a section on the line 11—11 of Fig. 5.
Figure 12:
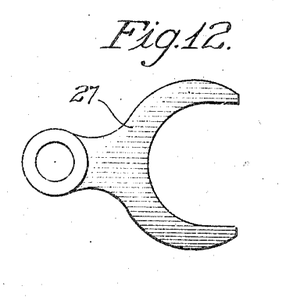
Fig. 12 is a plan view of a clutch fork.
Figure 13:
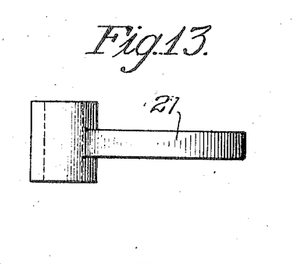
Fig. 13 is an elevation thereof.

The driving mechanism for the turret will now be described. (See Fig. 1.) The motor 4 is connected through a suitable coupling 19 to the main shaft 20 which carries a beveled pinion 21 which meshes with beveled gear 22, the latter being secured to the vertical shaft 23 (Fig. 7). Gear 24, which turns with said shaft, meshes with four planetary gears 25, thereby simultaneously driving the latter, all in the same direction. Each gear has an upper recess (Fig. 5) adapted to receive a friction clutch 26, said clutch being movable vertically and being rotatably mounted in a fork 27 (Fig. 12), which is slidably mounted on a vertical rod 28 and is held in uppermost position by a spring 29, the lower end of which rod is adapted to be engaged and elevated at suitable intervals by a cam hereinafter described. The upward and downward movement of said rod throws each clutch 26 into and out of engagement with the corresponding gear 24. The upper end of said clutch is received within a conical recess 30 in the turret, whereby its rotation is stopped abruptly when it is elevated out of engagement with the rotating gear beneath it. During the period when the clutch and its associated parts are not rotating, the notches are being ground in opposite sides of the disk, as hereinafter described.

Each gear 25 is provided with a downward extension 35 received within an antifriction bushing 36, the lower end of said extension being provided with a washer 37 and a nut 38. A hollow shaft 40 passes through and is splined in the clutch 26. Said shaft is therefore rotatable with said clutch. It has a collar 41 confined between a screw-threaded bushing 42 in the top of the turret and a washer 43. A spring 44 surrounds said shaft and presses said collar 41 and the clutch 26 apart. The upper end of said hollow shaft constitutes part of the chuck 14, Fig. 30, and has a tapering recess 45 in the upper end. Said hollow shaft incloses a vertically movable spindle 46, said spindle having a shoe 47 at its lower end. The spindle is held in lowermost position and the chuck is held closed by a spring 48. Said shoe at its lower end is adapted to be engaged by a cam hereinafter described. Its upper end carries a split extension forming chuck jaws 49 (Fig. 30), said jaws being tapered to fit said recess 45, whereby as the spindle is pressed downwardly said jaws are sprung together to enable the screw threads 50 to grip the screw-threaded stem 12 on the work piece. A shield 51 (Fig. 30) has screw-threaded engagement with and rotates with the hollow shaft 40.

Figure 14:
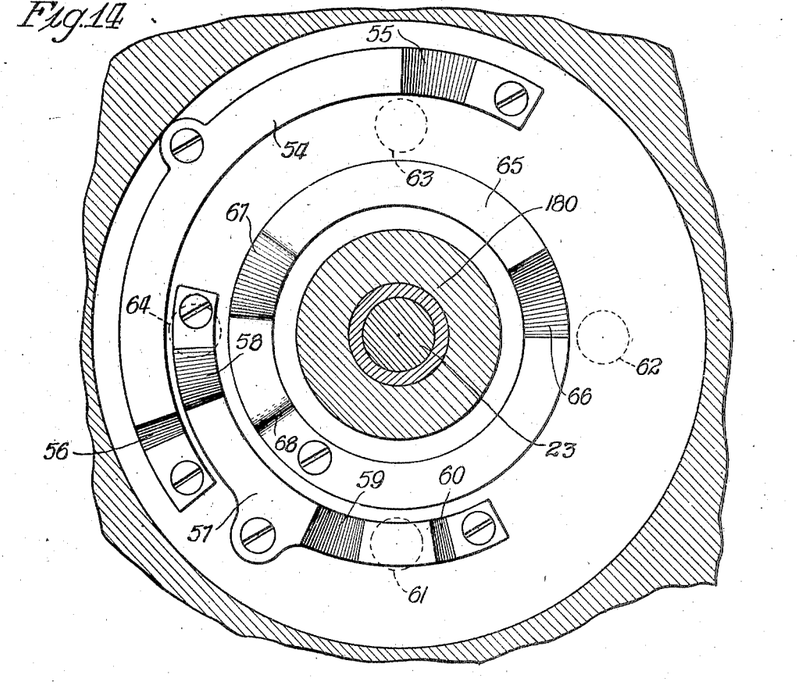
Fig. 14 is a plan view of the cams which control the operation of the chucks, the clutches therefor and the ejectors.
Figure 15:
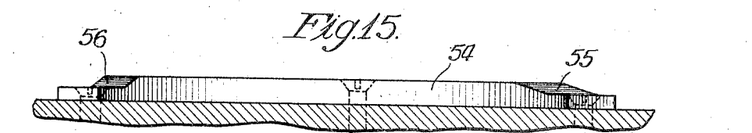
Fig. 15 is an elevation of the clutch controlling cam.
Figure 16:
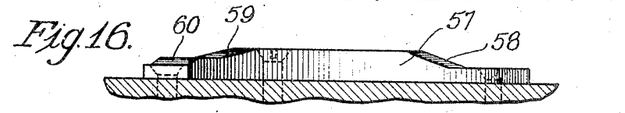
Fig. 16 is an elevation of the chuck controlling cam.
Figure 17:
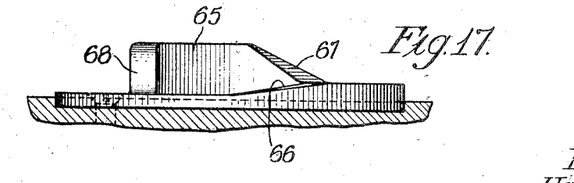
Fig. 17 is an elevation of the ejector controlling cam.

The action of the clutch 26 is controlled by an arc-shaped cam 54 (Fig. 14), which cam is suitably secured to the base plate and is provided with an incline 55 by means of which the rod 28 is raised to dis-engage said clutch from its corresponding gear 25. It is provided with an additional incline 56, down which said spindle slides to lower said clutch, whereby it reëngages said gear. The notches are ground in the disk during the interval when the chuck is not rotating. The upward and downward movement of the spindle 46, whereby the chuck is opened, partially closed or completely closed, is controlled by an arc-shaped cam 57 arranged on a circle concentric with the cam 54. It is provided with an incline 58 which elevates said spindle, thereby opening said chuck. It is also provided with a second incline 59 which permits said spindle to descend under the action of the spring 48, thereby nearly closing said chuck. A third incline 60 permits the spidle to complete its descent, at which time the jaws of the chuck will have gripped the stem on the support for the carbon disk. The operator supplies these small parts to the chucks by hand during the period that the turret is stationary, the position of the chuck at this moment being indicated by 61 (Fig. 14). Since the chuck is rotating continuously, it is necessary merely to insert the stem into the chuck, whereupon it is automatically screwed down as far as possible into the recess and firmly held.

The dotted circles 61, 62, 63, 64 in Fig. 14 indicate respectively the position at which the disks are fed to the chuck, the position at which they are ground by the roughing grinder, the position at which they are ground by the finishing grinder, and the position at which they are slotted.

Figures 29, 30, 31, 32, 33, 34:
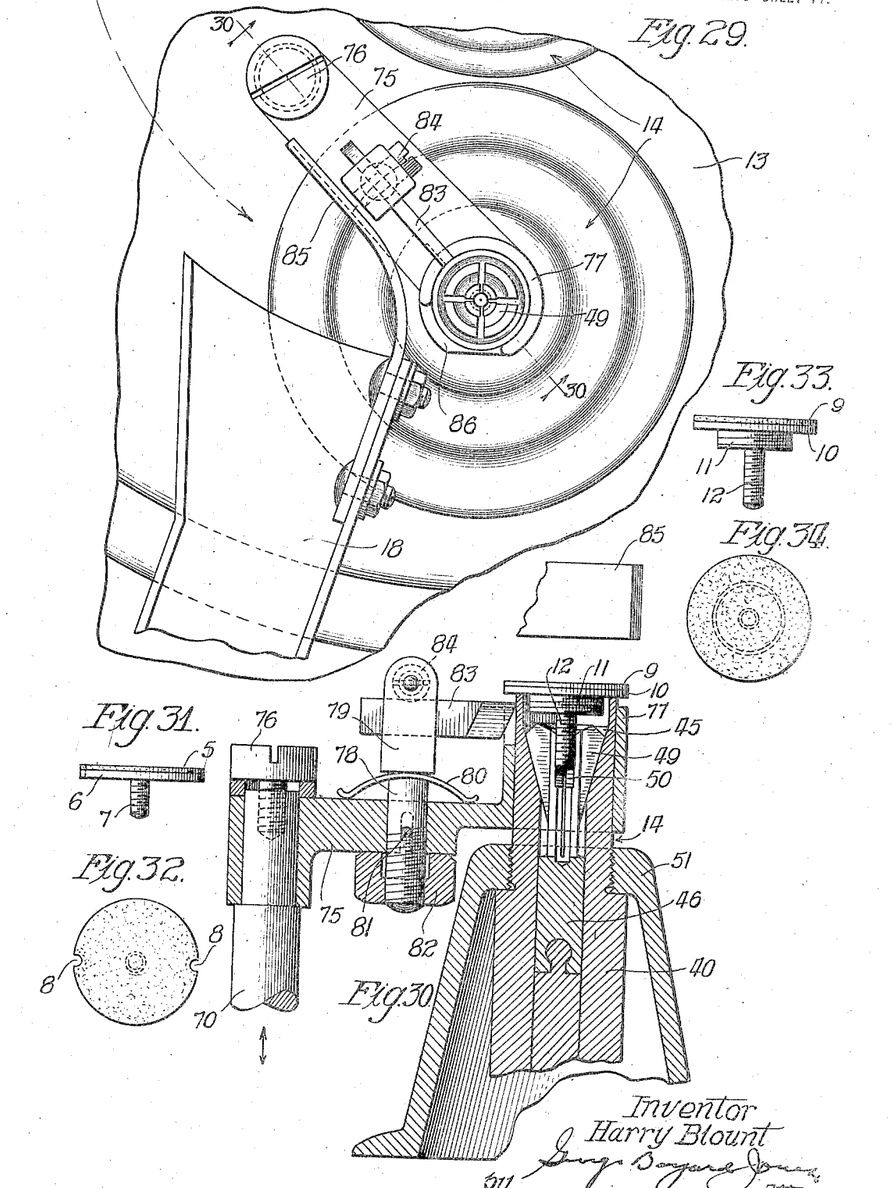
Fig. 29 is an enlarged plan view of the ejecting mechanism.
Fig. 30 is a sectional elevation on the line 30—30 of Fig. 29.
Fig. 31 is a side elevation of a completed disk and its support.
Fig. 32 is a top plan view thereof.
Fig. 33 is a side elevation of another form of disk and support.
Fig. 34 is a plan view thereof.

The ejecting of the carbon disks from the chuck, after these operations have been completed, is controlled by a cam 65 which is provided with an upward incline 66, a further upward incline 67, and a downward incline 68. Said cam is engaged by a roller 69 (Fig. 5) at the bottom of a spindle 70 and causes a vertical reciprocation of said spindle against the action of a spring 71, the latter being confined between the bottom of a recess in the turret 13 and a collar 72 on said spindle. The upward end of said spindle passes through a bushing 73 beneath which is a recess containing packing 74. As seen in Fig. 7, there are four such spindles. An arm 75 is secured to the upper end of each of said spindles 70 by means of a screw 76 (Fig. 30). Said arm is formed into a sleeve 77 at its outer end to surround the chuck 14. A tool post 78 passes loosely through an opening in the arm 75 and has an enlarged upper end 79 forming a shoulder against which a spring 80 bears, thereby impelling said tool post upwardly. Rotation of said post is prevented by a pin 81. The lower end of said tool post carries a nut 82 which permits adjustment of said tool post vertically. A small cutting tool 83 passes through a slot in the head 79, being confined therein by a screw 84.

As the turret revolves, the spindle 70 is raised by the incline 66 on the cam 65 immediately after the first grinding operation, thereby pressing the tool against the under side of the brass disk 6 or 10, thus turning off the bur which is formed. Said tool remains held against the under side of said disk until after the second grinding and the slotting operations, thereby removing any further burs which may form, after which the spindle 70 is still further elevated by the incline 67 on the cam 65, whereupon the upper end of the sleeve 77 engages the metal backing for the carbon disk and lifts it high enough to lift the screw-threaded stem 7 or 12 from the screw threads in the chuck jaws 49, it being understood that said jaws are in open position at this time.

The carbon disk and its support are swept aside by means of a curved deflector 85 (Fig. 29) secured to the chute 8. In order to enable the screw-threaded extensions on said supports to clear the sleeve 77 without obstruction, a portion of the latter is cut down from the top to form a notch 86.

It will be seen that as the turret rotates, the operator supplies the carbon disks and their supports to the chucks one at a time, and holds them momentarily against rotation, whereby they are automatically drawn down and clamped and thereafter ground, slotted, and ejected without further handling.

Figure 3:
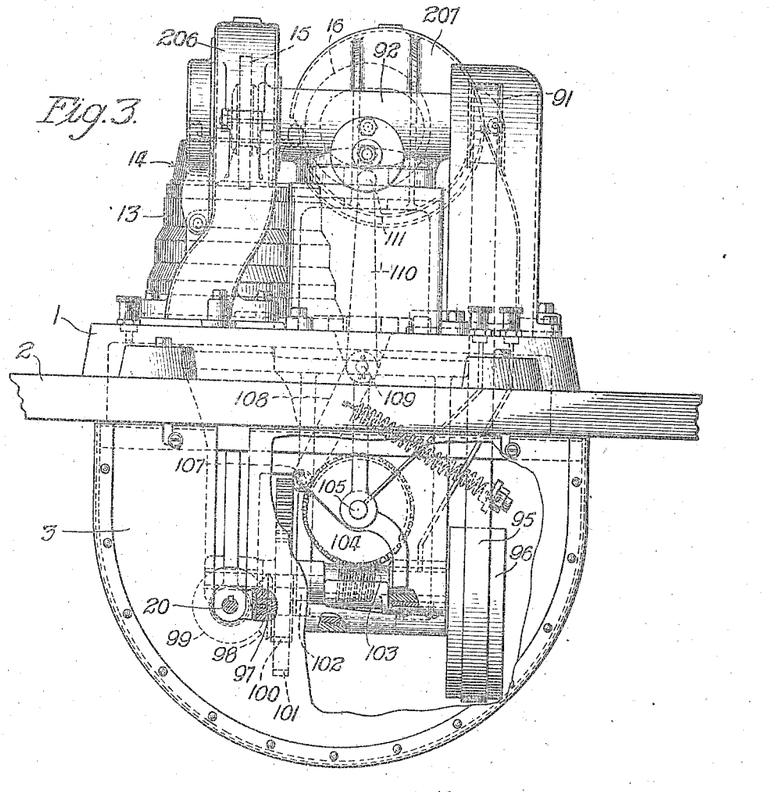
Fig. 3 is an elevation of the right hand end thereof.
Figure 18:
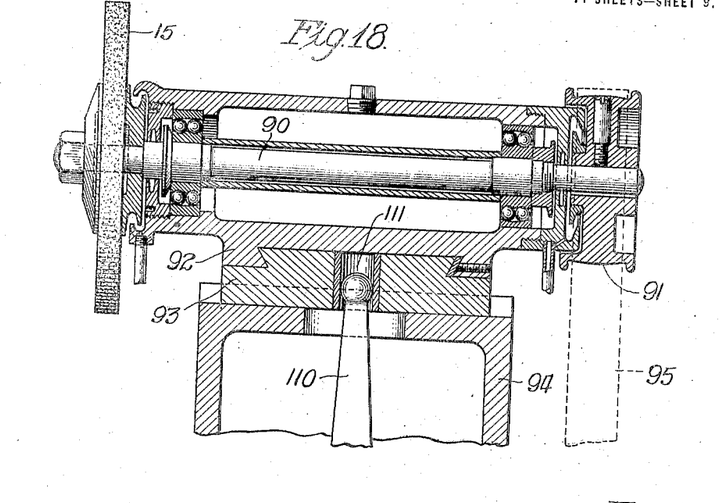
Fig. 18 is a central sectional elevation through the housing of one of the grinding wheels.
Figure 19:
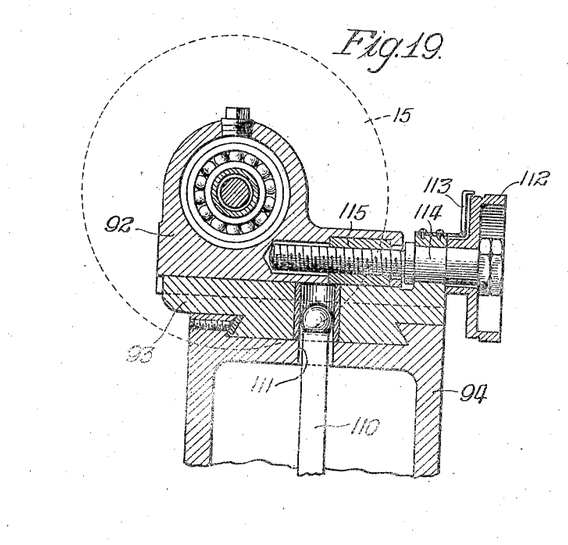
Fig. 19 is a section through said housing on the line 19—19 of Fig. 2.
Figure 20:
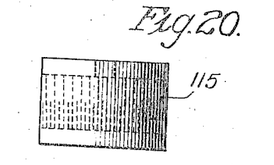
Fig. 20 is an elevation of an adjusting nut.
Figure 21:
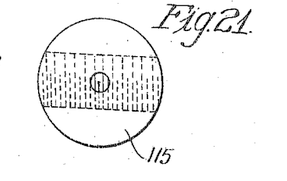
Fig. 21 is a plan view thereof.
Figure 22:
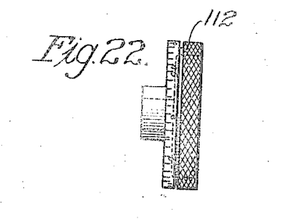
Fig. 22 is an elevation of the knurled head of a micrometer screw.

The operating mechanism for the roughing grinder will now be described, (Fig. 18). Said roughing grinder is removably secured to the rotatable shaft 90, on the other end of which a pulley 91 is located. Said shaft is mounted in suitable bearings in the housing 92, the latter being adapted to slide back and forth in ways in a block 93, said block being mounted in ways at right angles to said first ways in a supporting casting 94. The pulley for the grinding wheel is driven by a belt 95, said belt passing over a second pulley 96 (Fig. 1) mounted on a shaft 97 and driven by beveled gears 98—99, the latter gear being mounted on the main driving shaft 20. A pinion 100 is also mounted on said shaft 97 adjacent to the beveled gear 98, said pinion meshing with the gear 101, the latter turning with the shaft 102 and carrying a worm 103 which rotates a gear 104 (Fig. 3). Said gear is mounted on a shaft 105 which also carries a cam 106 (Fig. 1) engaged by a roller 107 on an arm 108. Said arm rocks about a pivot 109 and has an upward extension 110 with a ball top received within a cylindrical opening 111 in the block 93 (Fig. 19), whereby said block may be slid back and forth to move the grinding wheel back and forth in a direction at right angles to its plane of rotation. This movement of the grinding wheel not only insures accurate grinding of the carbon disk and its support, but also prevents uneven wearing away of the grinding wheel itself. Said grinding wheel may also be adjusted toward and away from the carbon disk to insure attainment of a predetermined diameter, within very close limits, by means of a knurled and indexed dial 112 having a pointer 113 mounted adjacent thereto. Said dial is mounted on the shaft 114, the end of which is screw-threaded and passes through a screw-threaded block 115 in the housing 92, whereby said adjustment may be readily effected (Fig. 19).

The mounting for the second grinding wheel or finishing grinder 16 is the same as that for the roughing grinder, illustrated in Fig. 18, and hence will not be described in detail. The grinding wheel is arranged to move back and forth at right angles to its plane of rotation as in the case of the first grinder, and it is also adjustable toward and away from the carbon disk. The means for effecting this back and forth movement consists of a cam 116 mounted on the shaft 105 (Figs. 1 and 6) having a circumferential groove which receives a roller 117 on the lower end of a lever 118, whereby said lever is oscillated about its pivotal support 119 as the cam rotates. Said lever has an upward extension 120 similar to the corresponding extension 110 shown in Fig. 18, and the back and forth movement of the roughing grinder is effected in like manner by said upper extension.

The grinding wheel is driven by means of a pulley 121 (Figs. 1 and 4), and a belt 122 which passes over pulley 123 on the shaft 124 in the lower part of the machine. Said shaft carries also the gear 125 driven by a gear 126 on the main shaft 20 of the machine.

Figures 23, 25, 26:
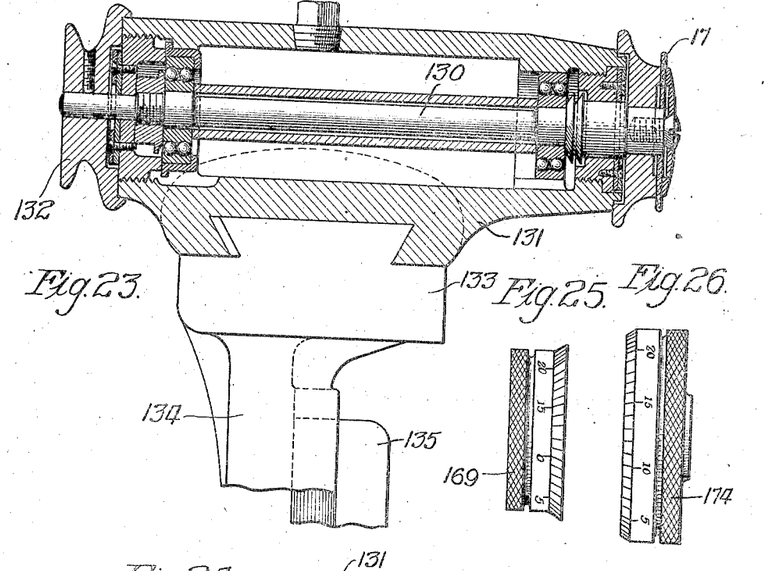
Fig. 23 is a central sectional elevation through the housing of one of the slotters.
Fig. 25 is an elevation of the knurled head of one of the micrometer screws used to adjust the slotters.
Fig. 26 is a similar elevation of the other of said micrometer screws.

Each of the slotting disks or grinders 17 (Fig. 23), of which two are employed, are mounted on a suitable shaft 130 suitably journaled in a housing 131, said shaft carrying a driving pulley 132 at its other end. The housing 131 is mounted to slide in ways in the head 133, the latter being integral with the vertical supporting arm 134 which slides up and down in ways in the guides 135. Said arm 134 carries a locking pin 136 (Fig. 5) adapted to be projected into an opening 137 in the guide 135, under the action of a spring 138, whereby said arm may be locked against movement when it is desired to omit the slotting operation, as hereinafter described. Said pin may be withdrawn by a flanged head 139 to unlock said members and rotated a quarter turn to lock it in place.

Figure 1:
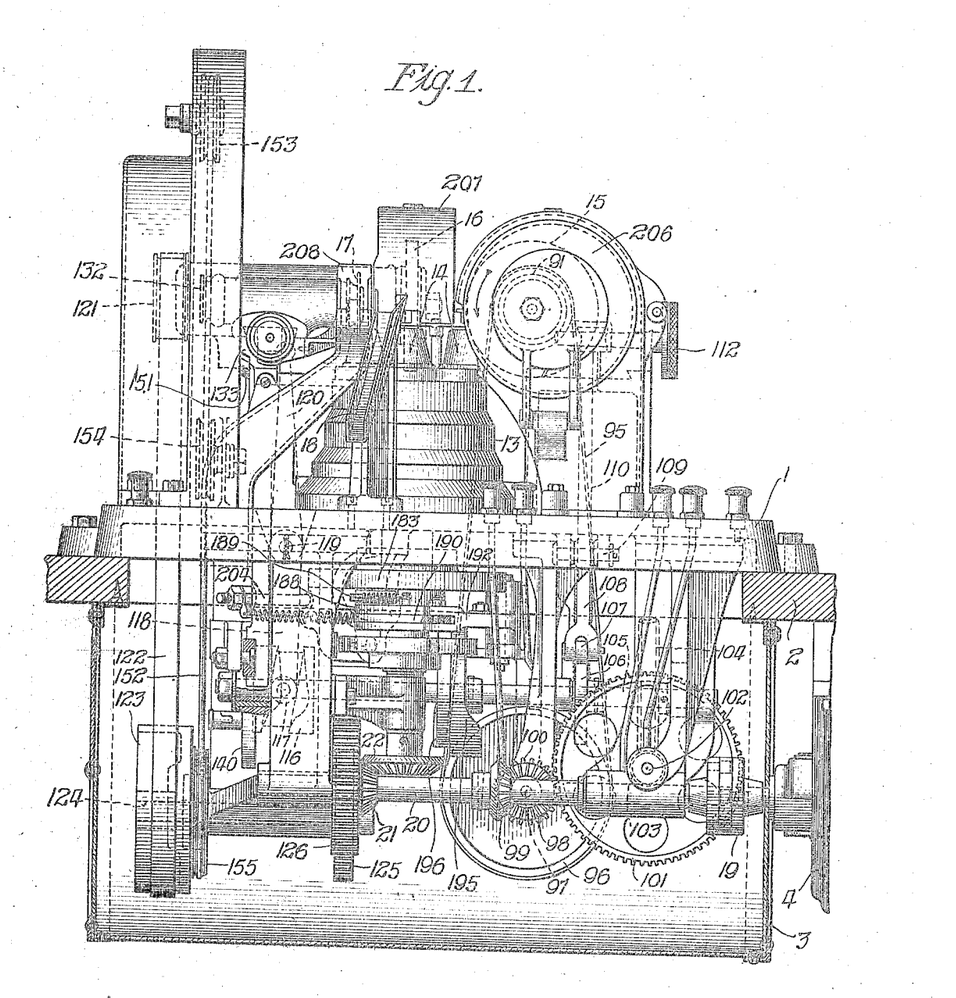
Figure 1 is a front elevation of the mechanism selected to illustrate the invention.
Figure 2:
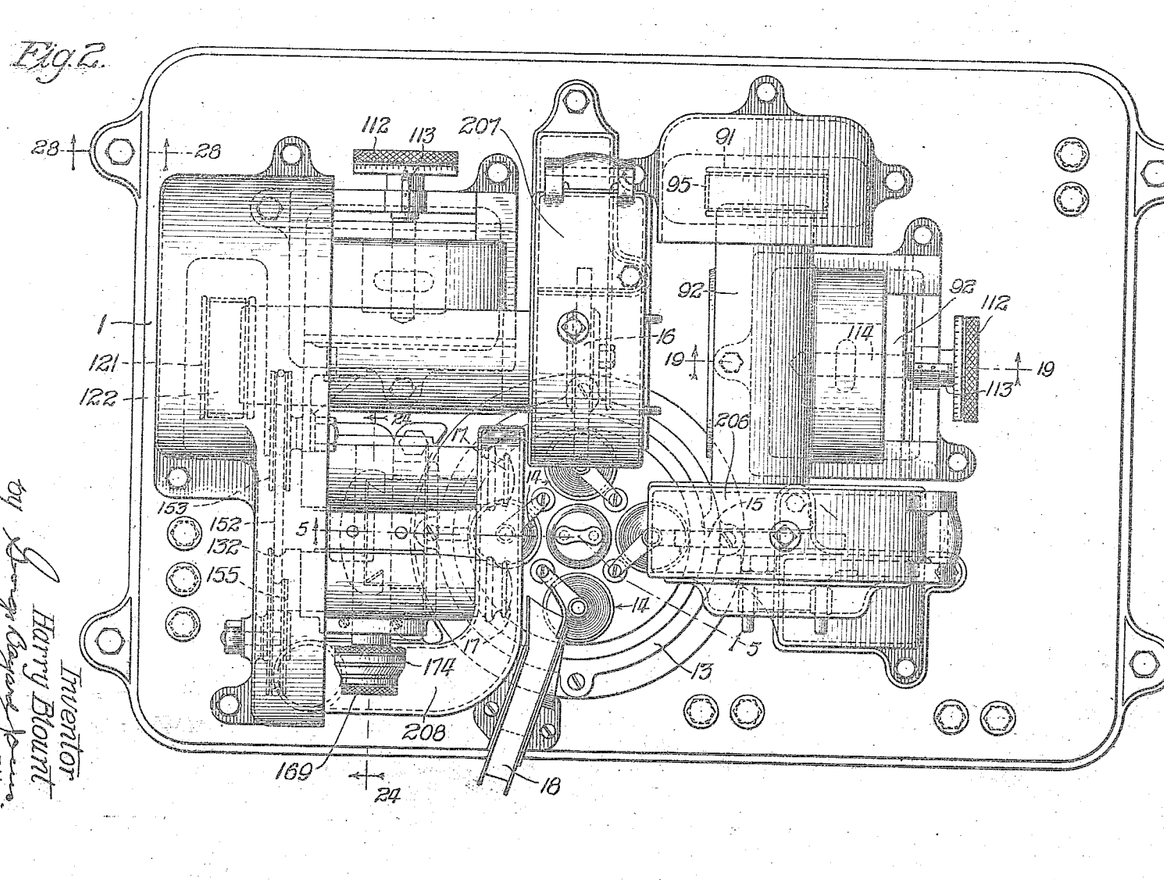
Fig. 2 is a top plan view thereof.
Figure 4:
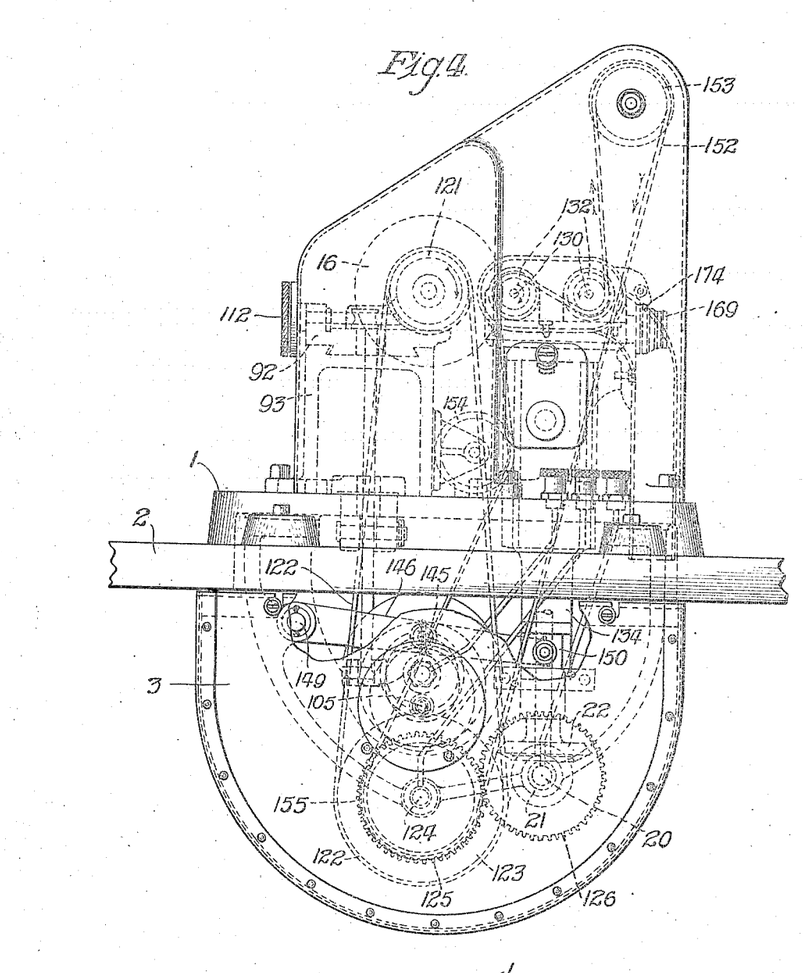
Fig. 4 is an elevation of the left hand end thereof.
Figures 5, 6:
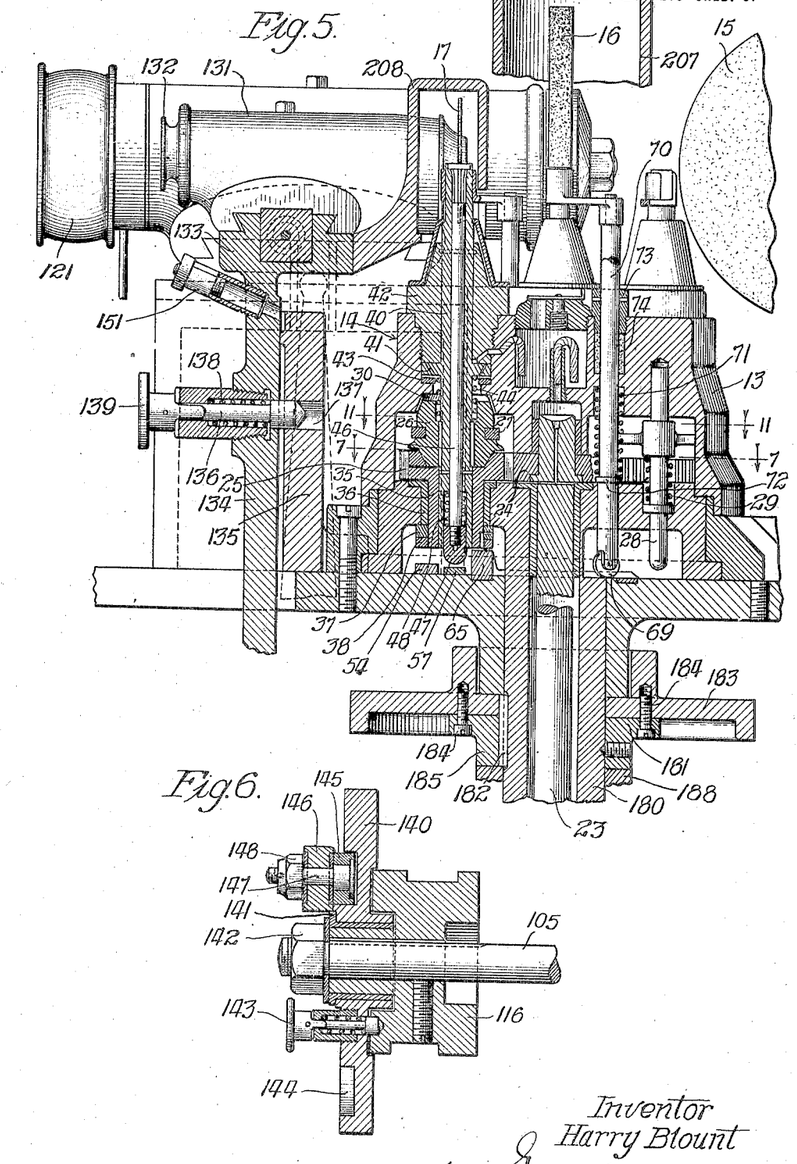
Fig. 5 is a section on the line 5—5 of Fig. 2.
Fig. 6 is a section through the slotting cam.

Up and down movement of the slotters and associated parts is effected by means of a cam 140 which is loosely mounted on a hub on the cam 116, which latter turns with the shaft 105 (Fig. 6). The cam 140 has a sliding fit on the cam 116 and has a bushing 141 interposed between the two and held on the shaft by a nut 142. In order to cause the cam 140 to turn with the shaft, a spring latch 143 is provided which locks it to the cam 116 and maintains the proper relative relation of these parts. The cam 140 has a cam groove 144 therein which receives a roller 145 carried on the arm 146, being mounted on a pin 147 therein and secured by a nut 148. The arm 146 is thereby oscillated about its pivotal support 149 (Fig. 4) as the shaft 105 rotates, thereby reciprocating the member 134 and the slotting disks mounted thereon. This connection with member 134 is made by a block 150 which slides in a slot in the lower end of said member (Fig. 1). A grease cup 151 is mounted diagonally in the upper end of the arm 134 to oil the ways in the support 135.

The slotting disks are driven by the pulley 132, previously mentioned, by means of a round belt 152 (Fig. 4). This belt passes over an upper pulley 153, an idler 154, and the lower pulley 155, in addition to passing over the two pulleys 132 mounted on the ends of the respective slotting disk shafts 130. The slotting disks rotate in opposite directions. The relative arrangement of the various pulleys is such that the upward and downward movement of said disks may be effected without varying the belt tension. The driving pulley 155 is integral with the pulley 123 mounted on the shaft 124 as shown in Fig. 1.

In order to vary the depth of the cuts made by the slotting disks, the following provision is made to permit adjustment of them toward and away from each other. A rotatable spindle 156 (Fig. 24) is provided with a collar 157 and a screw-threaded extension 158, said extension passing through a block 159 and serving to move the latter as the spindle is rotated. Said block is held by a stud 160 or other suitable means to one of the two housings 131. The spindle 156 passes through a thrust block 161, the collar 157 bearing against a partition 162 therein. Said collar is also confined by a non-rotatable thrust washer 163 held in place by a screw-threaded ring 164, the latter being locked in place by a set screw 165. A similar arrangement is provided at the other end of said thrust block, some of the same reference numerals being applied thereto.

Figure 24:
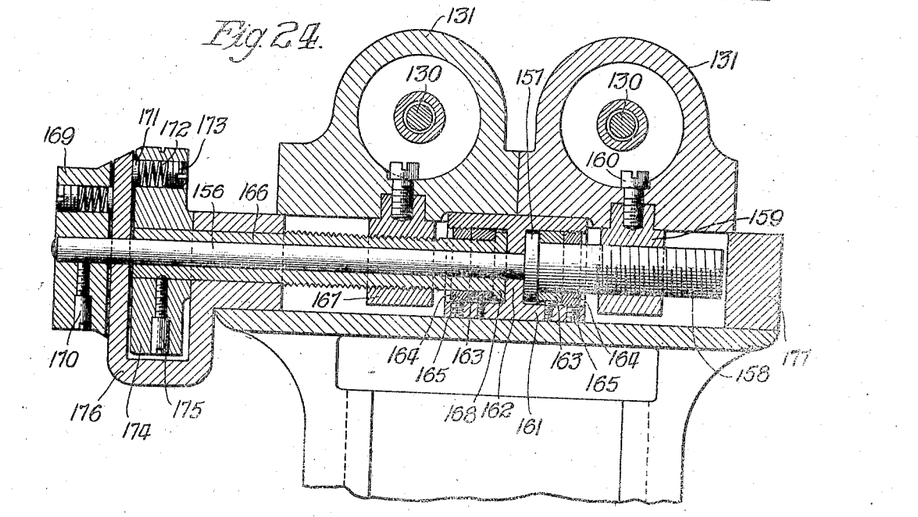
Fig. 24 is a section through said housing on the line 24—24 of Fig. 2.

The spindle 156 is surrounded by a sleeve 166, the latter having a screw-threaded portion passing through a block 167, which is secured to the other housing 131, whereby the latter may be moved toward and away from the first housing 131. Said sleeve is also provided with a collar 168, which is confined inside the thrust block in the same manner as the collar 157 on the spindle 156.

By virtue of the arrangement described, it will be seen that the spindle 156 and the sleeve 166 may be independently rotated. The rotation of the spindle 156 is effected by means of a knob or handle 169 secured on said spindle by a set screw 170. A small friction shoe 171 fits within a recess in said handle and is pressed inwardly by a spring 172 which abuts against a set screw 173. A second handle or knob 174 is in like manner secured by a set screw 175 to the sleeve 166, whereby it may be used to rotate the latter. Said handle is provided with a friction device 171, 172, 173 similar to that just described. Said two friction devices press against opposite sides of the member 176, whereby the grinding disks remain in any position to which they have been adjusted. It will be seen that as said handles are rotated, the disks are adjustable toward or away from each other. The end of the slot within which the blocks 159, 167 move are inclosed by a further block 177.

Figure 27:
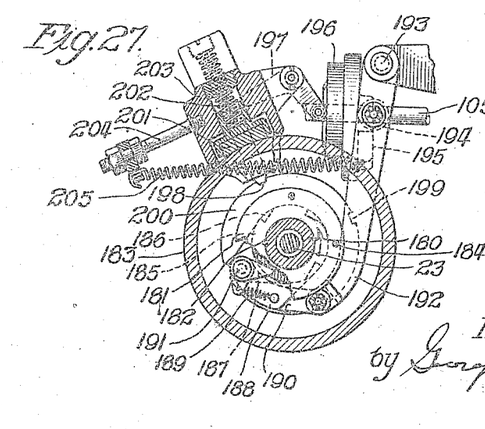
Fig. 27 is a section through the pawl and ratchet mechanism which rotates the turret.
Figure 28:
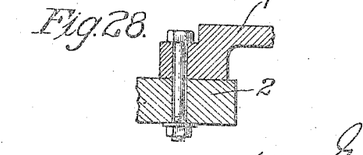
Fig. 28 is a section on the line 28—28 of Fig. 2.

The shaft 23, shown in Fig. 5, rotates continuously and is surrounded by a hollow shaft 180 having a flange 181 secured thereto and arranged to turn therewith by means of a spline 182. Said flange is secured to a friction disk or drum 183 by means of screws 184. Below said friction drum (Fig. 27) a disk 185, which is integral with 181, is also secured to said hollow shaft to turn therewith. Said disk is preferably provided with peripheral notches 186 adapted to be engaged by a pawl 187 mounted in a ring 188 (Fig. 1), said pawl being normally impelled inwardly by a spring 189. Said ring is oscillated back and forth by means of a link 190 having one end secured thereto by a pin 191 on which said pawl 187 is mounted, and having the other end pivotally secured to an arm 192, the other end of said arm being pivotally supported at 193. The arm 192 is oscillated by a roller 194 engaged by a cam 195 which is mounted on the shaft 105. As the shaft 105 rotates, the hollow shaft 180 is given a step by step rotation by means of the pawl and ratchet mechanism described. The cam 195 is so designed as to accelerate the turret gradually and also to retard its motion gradually to prevent abrupt starting and stopping thereof.

A second cam 196 is also mounted on the shaft 105 and by its rotation rocks a bell crank lever 197, thereby intermittently withdrawing the spring plunger 198 from one of the peripheral recesses 199 in the locking disk 200. This unlocking action takes place just prior to the advancing of the turret by the pawl and ratchet mechanism. A brake shoe 201 is held in yielding engagement against the brake drum 183 by means of a spring 202. Said friction shoe is mounted in a bracket 203 constituting part of the frame of the machine and carries a stud 204 to which is secured a spring 205 which effects the return movement of the arm 192. The function of the brake is to prevent overthrow of the turret when it is rotated by the pawl and ratchet mechanism.

The roughing and finishing grinding wheels, as well as the slotting grinders, are inclosed by suitable hoods 206, 207, 208, and connected to an exhaust system, whereby the dust may be drawn off. Said hoods may be readily opened to permit access to said wheels and to permit them to be trued up by the use of a suitable tool.

By means of the mechanism described herein, the carbon disks and their supports may be accurately ground to a predetermined diameter and any bur left by the grinding operation may be removed. Said disks may also be provided with the customary slots, although in certain cases where said slots are not required, the slotting operation may be omitted by rendering the slotting mechanism inoperative by the means previously described. The operations are rapid and automatic, except as to the insertion of the devices into the chucks, which operation is manual, although it is greatly facilitated by the fact that the chuck is rotating and automatically grasps and holds the screw-threaded stems.

Although the embodiment of the invention disclosed herein has been described in considerable detail in order to render the operation clear, it is to be understood that the invention may be embodied in various other forms, and is not to be limited necessarily to the structural features set out herein, except where limitations are imposed in the appended claims.

What is claimed is:

1. In a device of the class described, a rotatable turret, a plurality of rotatable chucks mounted therein, a plurality of grinding wheels arranged adjacent to the path of rotation of said chucks, and a notching wheel also arranged near said path of rotation, means for rotating said chucks when adjacent to said grinding wheels, but not when adjacent to said notching wheel, and means for moving said notching wheel during a period when the adjacent chuck is stationary.

2. In a device of the class described, means for holding and rotating articles about their axes, means for grinding said articles to a predetermined diameter, and means for cutting notches in said articles at diametrically opposite points.

3. In a device of the class described, means for holding articles, means causing a relative rotation of said holding and said grinding means about the axes of the articles to grind the latter, means for grinding said articles to a predetermined diameter, and means for cutting a notch in the periphery of each article.

4. In a device of the class described, a rotatable turret, means for intermittently rotating the same, a plurality of longitudinally movable spindles arranged in said turret equi-distant from the axis of rotation thereof, a longitudinally movable rod adjacent to each spindle, a clutch surrounding each spindle, a fork carried by each rod and engaging said clutch, a gear arranged to frictionally engage each clutch, a driving gear arranged concentric with the axis of rotation of said turret for driving each of said other gears, means for reciprocating said rods to cause engagement and disengagement of said clutches with said gears, chucks at one end of each of said spindles arranged to be opened and closed by the reciprocation of the latter, and means at the other ends of said spindles for causing such reciprocation.

5. In a device of the class described, a rotatable turret, a plurality of spindles rotatably and slidably mounted therein, a chuck at the end of each spindle controlled by the reciprocation of the latter, a single arc-shaped cam at the other end of said spindles and coöperating therewith to open said chucks, to partially close them, or completely close them at predetermined points in the rotation of said turret.

6. In a device of the class described, a horizontal base, a vertically arranged driving member, a plurality of arc-shaped cams arranged concentrically with respect to said driving member, a turret mounted on said driving member to rotate therewith, a plurality of chucks arranged on the upper part of said turret, an ejector adjacent to each chuck, means coöperating with each chuck and controlled by one of said cams for opening and closing said chuck, means controlled by another of said cams for intermittently rotating said chucks, and means controlled by a third cam for operating said ejectors.

7. In a device of the class described, a horizontal base, a vertically arranged driving member, a plurality of arc-shaped cams arranged concentrically with respect to said driving member, a turret mounted on said driving member to rotate therewith, a plurality of chucks arranged on the upper part of said turret, an ejector adjacent to each chuck, means coöperating with each chuck and controlled by one of said cams for opening and closing said chuck, means controlled by another of said cams for intermittently rotating said chucks, means controlled by a third cam for operating said ejectors, and a pawl and ratchet mechanism associated with said driving member for intermittently rotating said turret.

8. In a device of the class described, a turret, means for intermittently rotating the same, a plurality of chucks mounted on said turret, means for rotating said chucks, a grinding wheel adjacent to the path of rotation of said chucks, means for adjusting said grinding wheel toward and away from said chucks, and means for moving said grinding wheel at right angles to said first adjustment during the grinding operation.

9. In a device of the class described, a rotatable turret, a plurality of rotatable chucks thereon, a pair of grinding wheels arranged in planes radial to the axis of rotation of said turret, and a pair of grinding wheels arranged in a plane parallel to said axis, means for adjusting said first two grinding wheels laterally and also toward and away from said axis, and means for adjusting said second two grinding wheels toward and away from each other and also in a direction parallel to said axis.

10. In a device of the class described, a base, a main driving shaft, a turret, connections from said shaft to said turret for intermittently rotating the same, a plurality of grinding wheels arranged adjacent to said turret, cams for moving said grinding wheels back and forth along the axis of rotation and connections from said shaft to said cams for operating the latter.

11. In a device of the class described, a horizontal base, a turret thereon arranged to rotate about a vertical axis, a main driving shaft, a pawl and ratchet for intermittently rotating said turret, connections from said shaft to said pawl and ratchet, a pair of grinding wheels arranged in planes radial with respect to the axis of rotation of said turret, cams for moving said grinding wheels at right angles to their own planes, connections from said shaft to said cams for effecting such movement, an additional pair of grinding wheels arranged to rotate in a plane parallel to said axis, a cam for raising and lowering said pair of grinding wheels, connections from said main shaft to said cam, and means operated from said shaft for rotating all of said grinding wheels during such movement.

12. In a device of the class described, a horizontal base, a vertical shaft, a turret mounted to turn with said shaft, a plurality of chucks mounted on said turret, a pair of grinding disks arranged in a vertical plane above the path of rotation of said chucks, means for moving said grinding disks up and down to intersect said path of rotation, means for adjusting said disks toward and away from each other, and means connected with said vertical shaft for rotating said disks during said up and down movement and in any position of adjustment.

13. In a device of the class described, a rotatable turret, a plurality of chucks thereon, an ejector adjacent to each of said turrets for lifting the work piece therefrom, a deflector for directing said work piece into a receptacle, and means associated with each ejector for trimming the burr from each work piece before it is ejected.

14. In a device of the class described, a turret, a chuck thereon, an ejector adjacent to said chuck, said ejector comprising an extension surrounding said chuck, a cutting tool yieldingly mounted on said ejector, and means for moving said ejector relative said chuck to cause said cutting tool to first yieldingly engage the work piece, and said extension to thereafter positively engage said work piece and lift it from said chuck.

15. In a device of the class described, a rotatable turret, rotatable spindles, four rotatable chucks mounted thereon each adapted to hold a support for a carbon disk and to rotate the same and said disk in a horizontal plane, a roughing grinding wheel arranged in a vertical plane and so positioned as to grind the edges of each disk and its support, a finishing grinding wheel similarly arranged and spaced ninety degrees beyond said roughing grinding wheel, a pair of grinding disks spaced ninety degrees beyond said finishing grinding wheel and arranged to grind notches in opposite sides of each disk and its support, an ejector arranged forty five degrees beyond each of said spindles and serving to lift said disks and their supports from said chucks, means for rotating said chucks except when they are adjacent to said notching disks, means for opening each chuck prior to the operation of ejecting and for partially closing it thereafter to enable the operator to insert the disks and their supports, said means thereafter fully closing said chucks, and means for intermittently rotating said turret.

In witness whereof, I hereunto subscribe my name this 20th day of Feb. A. D., 1917.

HARRY BLOUNT.